United States Patent [19]

Rother

[11] Patent Number: 4,479,734
[45] Date of Patent: Oct. 30, 1984

[54] ADJUSTING MECHANISM FOR POSITION-ADJUSTABLE CONNECTED STRUCTURAL PARTS, ESPECIALLY A DRIVING-BELT TENSION MECHANISM WITH A CLAMPING COVERPLATE

[75] Inventor: Hubert Rother, Munich, Fed. Rep. of Germany

[73] Assignee: Bayerische Motoren Werke AG, Fed. Rep. of Germany

[21] Appl. No.: 311,182

[22] Filed: Oct. 14, 1981

[30] Foreign Application Priority Data

Oct. 17, 1980 [DE] Fed. Rep. of Germany ....... 3039215

[51] Int. Cl.$^3$ ................................................ F16D 1/00
[52] U.S. Cl. ........................................ 403/4; 403/408; 403/24
[58] Field of Search .................. 474/126, 114, 113; 403/4, 408, 24

[56] References Cited

U.S. PATENT DOCUMENTS

| 630,833 | 8/1899 | Johnston | 474/113 |
| 3,004,443 | 10/1961 | Garrans | 474/114 X |
| 3,430,507 | 3/1969 | Hurst et al. | 474/113 |

Primary Examiner—Andrew V. Kundrat
Attorney, Agent, or Firm—Craig & Burns

[57] ABSTRACT

An adjusting mechanism is for position-adjustable connected structural parts, such as in a driving-belt tension mechanism with a clamping coverplate. In the mechanism a first structural part that must be adjusted with respect to a second structural part that has a rack or gearing, into which a pinion that, by a threaded member, is clamped to position both structural parts, engages in such a way that, when the screw connection is loose a mutual shifting of the parts can be achieved by turning the pinion. The pinion has a nut-like collar that has a rack-meshing profile and an inside profile which is in one embodiment loosely slipped about a screw of the threaded member, and in another embodiment, rotatably fixed relative to the screw of the threaded member.

8 Claims, 5 Drawing Figures

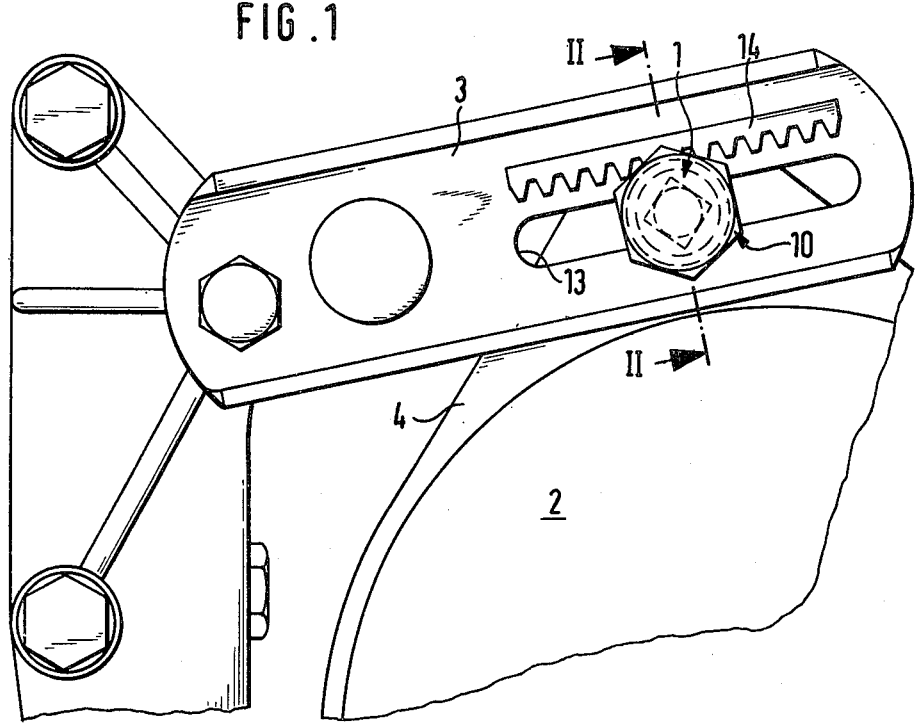
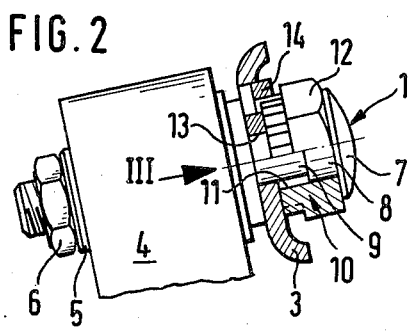
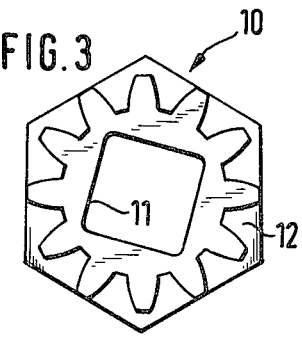

ADJUSTING MECHANISM FOR POSITION-ADJUSTABLE CONNECTED STRUCTURAL PARTS, ESPECIALLY A DRIVING-BELT TENSION MECHANISM WITH A CLAMPING COVERPLATE

The invention relates generally to an adjusting mechanism for position-adjustable connected structural parts such as in a driving-belt tension mechanism with a clamping coverplate. A first structural part that must be adjusted with respect to a second structural part has a gearing, into which a pinion that, by means of a threaded member, is clamped to position both structural parts, engages in such a way that, when the threaded member is loose a mutual shifting of the parts can be achieved by turning the pinion.

In a known adjusting mechanism of this general type according to DE-OS No. 19 11 062, the pinion is rigidly connected with the screw that is developed as a hexagon cap screw by hard-soldering. This severely limits the usability of the rigidly connected unit of the screw and the pinion, since for varying applications, different lengths and head sizes may be required. Keeping an inventory of various lengths and sizes is, accordingly both difficult and expensive. A particular disadvantage of consequence for this type of adjusting mechanism is that when heat-treated screws are hard-soldered to the pinion, in a loss of hardness of the screw. If screws are to be used that are not heat-treated they must be dimensioned stronger. This avoids the problem of loss of strength due to loss of hardness but increases the weight of the screw.

The invention is an adjusting mechanism generally of the aforementioned type wherein the above-discussed disadvantages are avoided. This is accomplished according to the adjusting mechanism of the present invention whereby different types and lengths of standard screws as well as standard thread nuts or a taphole in one of the structural parts may be selectively combined with a pinion that is loosely slipped on the shaft of the screw. More specifically, according to the invention the pinion has a collar that has a key-meshing profile, and that the pinion has an inside profile which is loosely slipped about a screw of the threaded member.

According to one disclosed embodiment of the invention the inside profile engages, in a rotation-proof manner, an outer profile at the shaft of a screw of the threaded member, the screw being selectively fixed by means of a nut relative to the structural parts.

In a second embodiment of the invention the inside profile of the pinion is penetrated, with free space for turning, by the shaft of a screw of the screw connection, the screw being fixed in a taphole of one of the structural parts.

A pinion for an adjustment mechanism according to the invention, advantageously makes it possible to use the pinion not only in connection with screws of different lengths but screws with or without cylindrical outside shaft profiles. In the first case, the screw may be held non-rotatable relative to the structural parts by the pinion during the clamping process or may be turned relative to the structural parts by the pinion during the adjusting process, with a principal advantage being that the clamping force is produced by a nut at the free shaft end of the screw. In the second case, the pinion can be rotated freely on a smooth shaft of the screw or a threaded shaft of the screw, and the screw interacts with a taphole of the second structural part. This results in manifold possibilities for usage for the adjusting mechanism according to the invention and the pinion that always has the same design.

As shown in preferred embodiments as discussed hereafter, the collar of the pinion is developed as a hexagon and as the inside profile, the pinion has a square opening.

These and other objects, features and advantages of the present invention will become more apparent from the following description when taken in connection with the accompanying drawings, which show, for purposes of illustration only, several embodiments in accordance with the present invention.

FIG. 1 shows an adjusting mechanism according to a first embodiment of the invention for the V-belt drive of a generator of an internal-combustion engine;

FIG. 2 shows a partial section of the adjusting mechanism taken along line II—II in FIG. 1;

FIG. 3 shows a pinion used in the adjusting mechanism according to FIG. 1;

Figure 4:
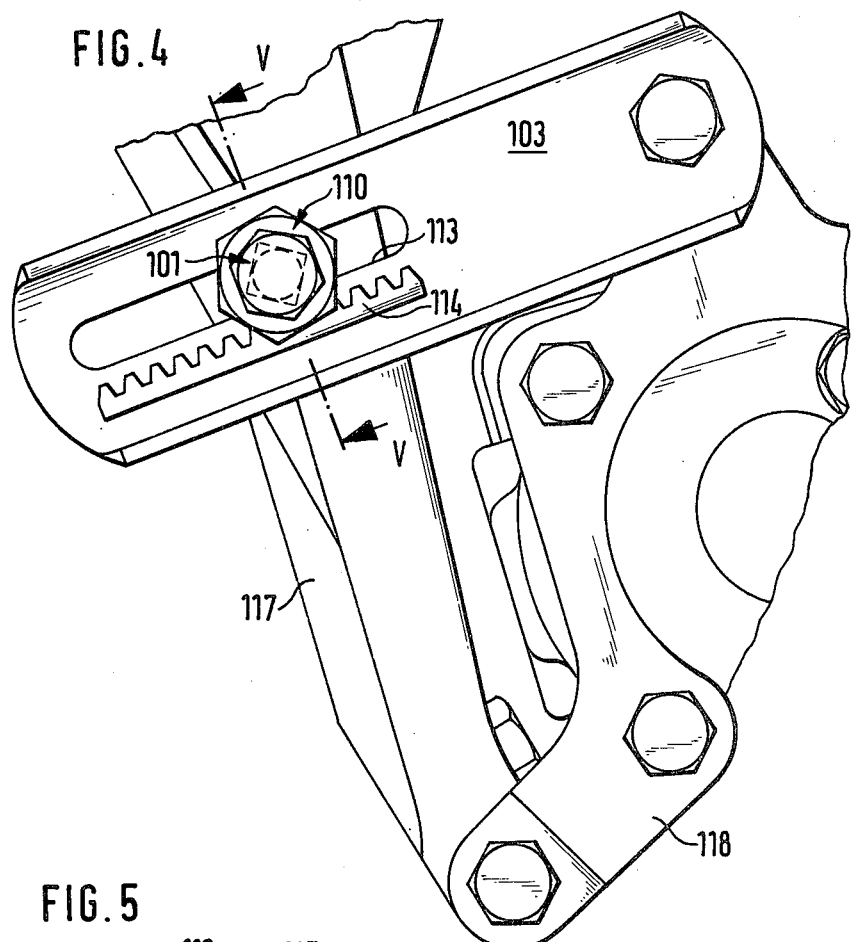
FIG. 4 shows a second embodiment of the adjusting mechanism according to the invention and FIG. 5 shows a partial section taken along line V—V of the adjusting mechanism according to FIG. 4.

FIGS. 1 and 2 show an adjustment mechanism with a standard lock screw as screw 1 for the clamping of the structural parts that are connected with each other. In this case the adjustment mechanism is used for the adjustment of a V-belt drive (that is not shown) for a generator 2. The connected structural parts include a clamping coverplate 3 and an attachment 4 that is formed as part of the housing of the generator 2 with the screw 1 extending through this shaped attachment 4. On the back of the attachment 4, a shim or washer 5 is disposed on the screw 1 between a hexagonal nut 6 threaded on the end of the screw and the attachment 4. The screw 1 is developed as a standard lock screw with a cup head 7 and a square shank portion 8 as the outside profile in the transition area between cup head 7 and shaft 9. A pinion 10 with an inside profile generally in the shape of a square opening 11 is complementary in size and loosely received on the square 8 so that the pinion 10 is clamped between the cup head 7 and the clamping coverplate 3 when the nut 6 is tightened. The pinion 10 (FIG. 3) has a nut-like collar 12 that is shaped like a hexagon, by means of which the pinion 10 and the screw 1 can be turned using a corresponding wrench. Forces imparted to the nut-like collar by the wrench are transmitted to the screw by way of the square shank portion 8 engaging the square opening 11. The clamping coverplate 3 has an oblong or elongated hole 13 through which the screw 1 passes. Parallel to this oblong hole 13 is a gearing 14 in the shape of a rack the rack being formed as part of the clamping coverplate 3 by pressing, and the pinion 10 meshing with this rack.

A turning of the pinion 10 and thus a shifting of the screw 1 within the oblong hole 13 of the clamping coverplate 3 causes a change of position of the attachment 4 with respect to the clamping coverplate 3 due to the interaction of the pinion 10 with the rack or gearing 14. After the adjustment has taken place, the hexagonal nut 6 is tightened and the coverplate, attachment, washer and pinion are all clamped relative to one another. The generator 2 is hinged on another attachment that is not shown and is driven by means of a V-belt drive that is also not shown. By adjusting the position of the attachment 4 with respect to the clamping coverplate 3, the tension of the V-belt can be adjusted.

Figure 5:
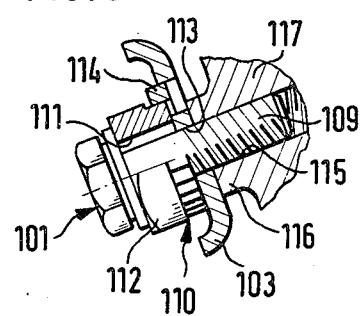

In the embodiment according to FIGS. 4 and 5, an adjustment mechanism is shown where a standard hexagon cap screw is used as the screw 101 which, with its shaft 109 penetrates through the square opening 111 of the pinion 110 and is rotatable relative thereto. The screw 101 is screwed into an attachment 116, having a taphole 115, of a support 117 to which a sheet-metal holder 118 is hinged at a position spaced away from the screw 101, with the sheet-metal holder 118 being pivotably connected with the coverplate 103 and being intended for an aggregate that must be adjustably positioned. The clamping coverplate 103 and the pinion 110 are developed as in the first embodiment according to FIGS. 1 to 3. However, in this case, there is no transfer of rotational forces from the pinion 110 to the screw 101 and vice versa because the threaded shaft 109 can be freely turned in the square opening 111. After loosening the screw 101, the pinion 110 can be turned by means of a wrench and the clamping coverplate 103 and the sheet-metal holder 118 hinged thereto may be brought into a desired adjusting position. Then the pinion 110, by means of the wrench, is in the position wherein the desired adjustment is maintained held while the screw 101 is tightened by means of another wrench.

By means of the described invention, it is possible to use the pinion 10 and 110 in connection with different standard screws, which not only have different lengths but also different developments with respect to their head or their transition area between the head and the shaft. Thus, as shown in the first embodiment, a standard lock screw, also known as a stove bolt, may be used in connection with a standard hexagonal nut, or, as shown in the second embodiment, a standard hexagon cap screw that engages with a taphole may be used. The pinion 10 and 110 may, in fact, as is clearly evident from the above, be the same.

While I have shown and described only several embodiments in accordance with the present invention, it is understood that the same is not limited thereto but is susceptible of numerous changes and modifications as would be known to those skilled in the art, given the present disclosure. I therefore do not wish to be limited to the details shown and described herein but intend to cover all such changes and modifications as are encompassed by the scope of the appended claims.

I claim:

1. An adjusting mechanism for position-adjustable connected structural parts, such as in a driving-belt tension mechanism, where a first structural part that must be adjusted with respect to a second structural part includes a rack means, pinion means adapted to position and be clamped along with said structural parts screw means for clamping of the parts, said pinion means including an opening therethrough for receiving said screw means, said opening being non-circular and cooperating with a non-circular portion of said screw means to relate said pinion means to said screw means.

2. An adjusting mechanism according to claim 1, wherein the opening of said pinion means is penetrated, with free space for turning, by the shank of said screw means which is fixed in a taphole of one of said structural parts.

3. An adjusting mechanism according to claim 1, including threaded means for cooperating with said screw means to fixedly position said structural parts.

4. An adjusting mechanism according to claim 1, 2 or 3, wherein the collar means of the pinion means is developed as a hexagon.

5. An adjusting mechanism according to claim 3, wherein as the opening in the pinion means has a generally square configuration.

6. An adjusting mechanism according to claim 5, wherein said screw means is developed as a standard lock screw with a cup head with a square transition area between the cup head and the shaft which engages the square opening of the pinion means.

7. An adjusting mechanism according to claim 1 or 2, wherein as the opening in the pinion has a square opening.

8. An adjusting mechanism for position-adjustable connected structural parts, such as a driving belt tensioning device, comprising slot means formed in one of said structural parts for receiving a shank of a screw means therethrough, rack means on said one of said structural parts for cooperating with a pinion means, pinion means for cooperating with said rack means to adjustably position said structural parts, screw means having a head and a shank for cooperating with a threaded means, threaded means threadably receiving a threaded portion of said shank for cooperating with said screw means to fixedly position said structural parts, nut-like collar means on said pinion means for engagement by a tool, and opening means through said pinion means of a non-circular configuration for receiving the shank of said screw means therethrough, whereby said pinion means may be used with screw means having various head configurations and in the instance of a screw means having a generally non-circular transition portion is rotatably fixed relative to the screw means and in the case of a screw means having a generally cylindrical shank which extends from the head means in a continuous manner is freely rotatable relative to the screw means, wherein engagement of the pinion means with the rack means and rotation of the pinion means adjustably positions the structural parts and wherein tightening of the nut means fixedly positions the structural parts.

* * * * *